United States Patent [19]

Moller

[11] Patent Number: 5,749,661
[45] Date of Patent: May 12, 1998

[54] PLASTIC SEPARATOR CAGE FOR BALL BEARINGS

[75] Inventor: Rainer Moller, Stammheim, Germany

[73] Assignee: FAG OEM und Handel AG, Germany

[21] Appl. No.: 792,437

[22] Filed: Jan. 30, 1997

[30] Foreign Application Priority Data

Feb. 13, 1996 [DE] Germany ............ 296 02 481.3

[51] Int. Cl.⁶ ...................................... F16C 33/46
[52] U.S. Cl. ............................. 384/526; 384/531
[58] Field of Search ........................ 384/523, 526, 384/527, 531, 533, 534

[56] References Cited

U.S. PATENT DOCUMENTS

| | | | |
|---|---|---|---|
| 3,436,135 | 4/1969 | Bomberger | 384/526 |
| 4,723,851 | 2/1988 | Troster et al. | 384/523 |
| 5,156,462 | 10/1992 | Jacob et al. | 384/526 X |
| 5,352,047 | 10/1994 | Ingall et al. | 384/526 X |

FOREIGN PATENT DOCUMENTS 1404361  8/1975  United Kingdom ........... 384/527

*Primary Examiner*—Thomas R. Hannon
*Attorney, Agent, or Firm*—Ostrolenk, Faber, Gerb & Soffen, LLP

[57] ABSTRACT

A separator or cage for an antifriction bearing, particularly a ball bearing, wherein the separator starts as a flat strip with an edge strip on one side, and webs projecting laterally from the edge strip and defining pockets for balls between neighboring webs. The strip is bendable at reduced thickness areas along its length to form a ring for installation of the separator between the annular bearing rings. Radially projecting elastic holding noses defined on the surface of the strip at the webs engage at a race of one of the bearing rings and particularly behind a shoulder at one of the races for preventing axial emergence of the separator from between the bearing rings.

14 Claims, 2 Drawing Sheets

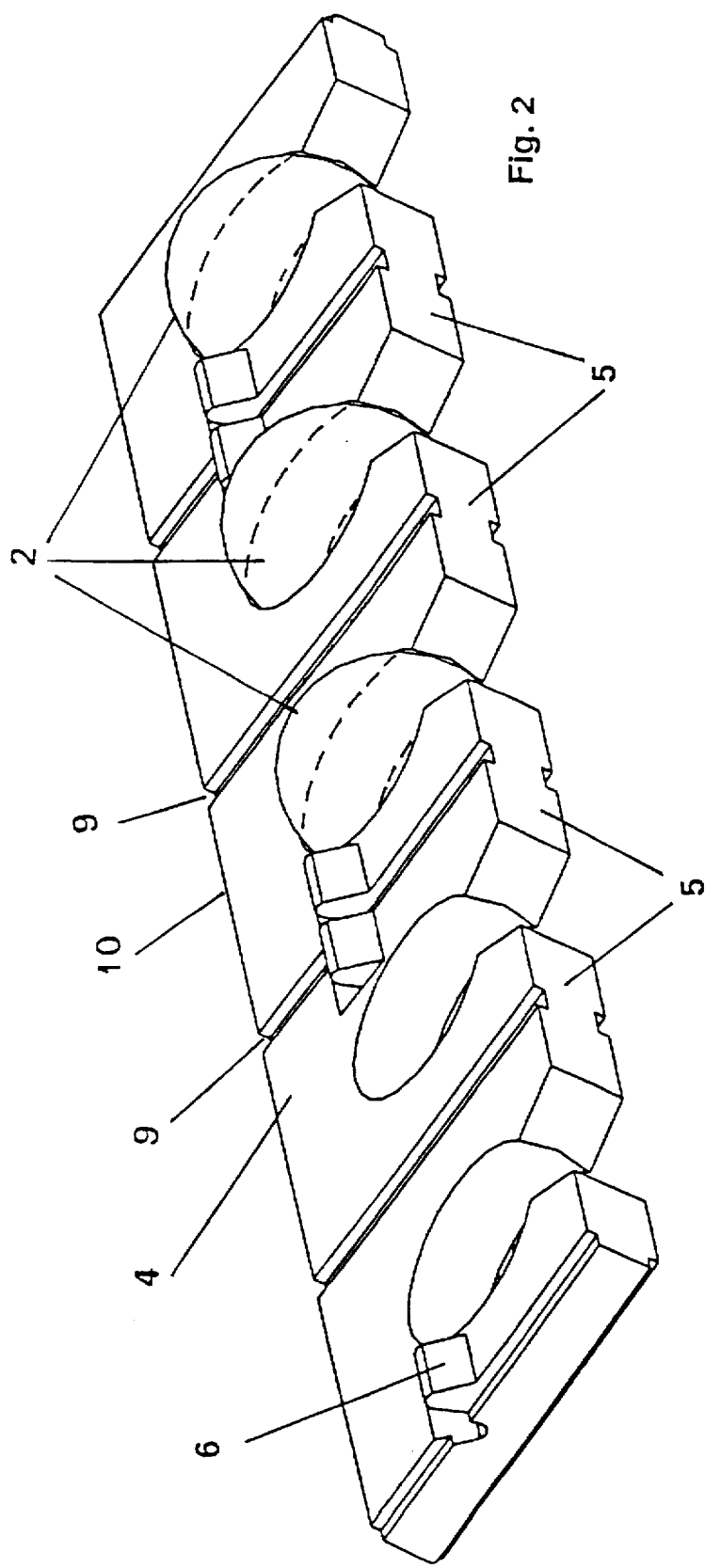

PLASTIC SEPARATOR CAGE FOR BALL BEARINGS

BACKGROUND OF THE INVENTION

The present invention relates to a plastic separator cage for ball bearings designed for inexpensive easy manufacture and installation in a bearing and to prevent the separator leaving the bearing.

A separator cage disclosed in Federal Republic of Germany 33 18 945 A1 has webs with approximately radially directed elastic projections which extend into grooves of the race. The race is without a shoulder at its side. The elastic projections are intended to hold the cage axially within the bearing and to prevent it from wandering, e.g. inward or outward. Particularly with ball bearings which are subjected to combined radial and axial loading, enormous forces act on the separator due to either travel ahead or lagging behind of the balls. This tends to push the separator out of the bearing. This "cherry-stone effect" (so named since it can be compared with a cherry stone which, when pinched between thumb and index finger, is shot away) can be observed particularly in bearings of large diameter because in that case, the cross section of the separator cage is small as compared with its diameter and the resulting restraining force of the pocket walls is also slight. Furthermore, plastic separators are becoming increasingly expensive for larger diameter bearings due to the tooling expenses for the injection mold.

Sheet metal separators with bent over webs which extend into the race and grip behind the shoulder of the race are disclosed in U.S. Pat. No. 2,357,196. Those separators are also too heavy and expensive for large diameter bearings.

Federal Republic of Germany 24 62 652 C2, further discloses providing a slit plastic separator cage with flexible sections that serve as articulation points in order to enable inserting the cage by threading it between the first row of balls into the second row of balls. Such a separator can also be pushed out axially by the "cherry stone effect" and may strike against the first row of balls, which may lead to disturbances and even to breakage of the bearing.

SUMMARY OF THE INVENTION

The object of the present invention is to provide a plastic material separator cage that is reliably secured by simple means against wandering axially and that can be produced at favorable cost even for bearings of larger diameter.

The invention concerns a separator or cage for an antifriction bearing, particularly a ball bearing, wherein the separator starts as a flat strip including an edge strip on one side and webs projecting laterally from the edge strip and defining pockets for balls between neighboring webs. The strip is bendable at reduced thickness areas along its length to form a ring enabling installation of the separator between the annular bearing rings. Radially projecting elastic holding noses defined on at least one surface of the strip at at least some of the webs engage at a race of one of the bearing rings and particularly behind a shoulder at one of the races for preventing axial emergence of the separator from between the bearing rings.

Using separator strips which are bent or curved into a ring only upon installation of the separator provides a separator cage of low cost even for large diameter cages obtained. The separator strips are supplied in any length dimension. The strip shape is dependent only on the pocket size of the balls used and not on the bearing diameter in which the separator is disposed. As a result of the strip being able to be used universally, it can be of very favorable cost. Elastic holding noses are directed alternately inwardly and outwardly to assure reliable fixing of the separator in the bearing without substantial increase in the cost of the separator strip.

Other features and advantages of the present invention will become apparent from the following description of the invention which refers to the accompanying drawings.

BRIEF DESCRIPTION OF THE DRAWINGS

FIG. 2 shows in perspective a portion of a separator strip in accordance with the invention.

DETAILED DESCRIPTION OF AN EMBODIMENT OF THE INVENTION

Figure 1:
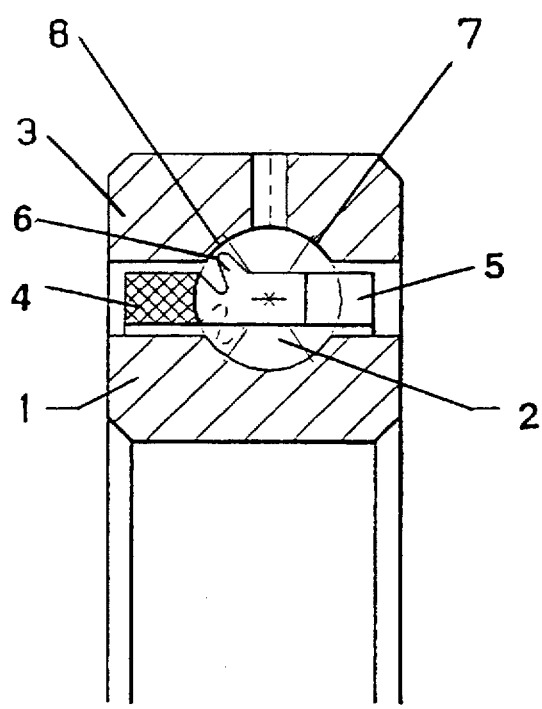
FIG. 1 shows a cross-section of the separator of the invention on an example of a four-point contact bearing.

The antifriction ball bearing in FIG. 1 includes an inner ring 1, the rolling body balls 2, the outer ring 3, and the separator or cage 4. The bearing illustrated is a single row ball bearing. Other types of roller bearings, including more than one row of rolling bodies, may employ the invention.

As can be noted from FIG. 2, before its assembly into a bearing, the separator 4 is a basically flat, continuous, uncurved plastic material strip. The plastic material may be reinforced by glass or by carbon fibers. At regular intervals, the thickness of the strip is sharply reduced, defining thin, weakened, bendable areas 9 at which the separator is bendable to define its final curved shape to enable its installation between the rings 1 and 3. The separator includes pairs of webs 5 extending laterally, transversely of the strip from its lateral edge strip 10. Adjacent webs define a pocket to confine one of the balls 2. Each pair of webs 5 that confine a ball are located between two thin bendable areas 9 which are at spaced intervals along the strip so that the strip is not bendable at a pocket for a ball, but is bendable outside the pockets.

At least some of the webs are shaped to define elastic holding noses 6 which project above the surface, e.g. above one surface or above the opposite surfaces, of the flat strip of the separator to extend alternately outward or inward in the race 7. When the separator strip is formed round into a ring, the noses may rest on the shoulder 8 of the respective adjacent bearing ring race. This prevents axially outward wandering of the separator or axial emergence of the separator from between the rings.

The four point bearing in FIG. 1 can be used, for instance, as a bearing for computer tomographs. The plastic separator cage of the invention can also be used in thin ring bearings for industrial robots or in textile machines or as riding bolster bearings for fork trucks.

Although the present invention has been described in relation to a particular embodiment thereof, many other variations and modifications and other uses will become apparent to those skilled in the art. It is preferred, therefore, that the present invention be limited not by the specific disclosure herein, but only by the appended claims.

What is claimed is:

1. A separator for the rolling bodies of an antifriction bearing, wherein the separator comprises
    a generally flat strip including webs extending transversely of the strip, adjacent webs defining pockets between them for respective rolling bodies;
    the strip being bendable to form a ring;
    the strip having opposite sides; elastic holding noses being defined on at least one of the sides of the strip and projecting out of the strip, the noses being shaped and sized to project radially out of the ring into which the strip is bent, whereby the noses are engageable in one bearing ring of the antifriction bearing for preventing axial direction movement of the separator that has been formed into a ring.

2. The separator of claim 1, wherein the holding noses are defined on at least some of the webs.

3. The separator of claim 1, wherein the separator strip includes an edge strip along one lateral edge of the separator strip and the webs project laterally of the separator strip out of the edge strip.

4. The separator of claim 3, wherein the holding noses are defined on at least some of the webs.

5. The separator of claim 1, wherein the pockets are shaped for receiving ball shaped rolling bodies, whereby the separator may be for a ball bearing.

6. The separator of claim 1, wherein the separator is comprised of plastic material.

7. The separator of claim 6, wherein the plastic material of the separator is reinforced by glass or by carbon fibers.

8. The separator of claim 6, wherein the separator strip generally has a first thickness dimension which is thick enough as to prevent bending of the strip along its length and the separator strip has short length reduced thickness sections at intervals therealong at which the separator strip is bendable for forming the separator into a ring.

9. The separator of claim 1, wherein the noses, as seen in the circumferential direction, extend alternately inward and outward.

10. The separator of claim 1, wherein the separator strip generally has a first thickness dimension which is thick enough as to prevent bending of the strip along its length and the separator strip has short length reduced thickness sections at intervals therealong at which the separator strip is bendable for forming the separator into a ring.

11. The separator of claim 10, wherein the reduced thickness sections along the length of the strip are positioned between and define adjacent webs of the strip.

12. The separator of claim 11, wherein the reduced thickness sections are between some adjacent webs but not between each two adjacent webs which define a pocket for the rolling bodies.

13. An antifriction bearing comprising an outer ring, an inner ring in the outer ring and spaced radially inward from the outer ring, rolling bodies between the inner and the outer rings, the inner and outer rings having respective races and the rolling bodies rolling on the races;

a separator for the rolling bodies, the separator comprising a generally flat strip including webs extending transversely of the strip, adjacent webs defining pockets between them for respective rolling bodies;

the the strip being bendable and formed into a ring installed between the inner and outer rings; the ring shaped strip having opposite sides;

elastic holding noses being defined on at least one of the sides of the strip and projecting out of the strip, the noses being shaped and sized to project radially out of the ring into which the strip is bent, whereby the noses are engageable in one of the inner and the outer rings of the bearing for preventing axial direction movement of the separator that has been formed into a ring.

14. The bearing of claim 13, wherein one of the rings has a shoulder thereon and the noses of the separator are shaped for gripping behind the shoulder with the separator between the rings for preventing axial emergence of the separator out of the space between the rings of the bearing.

\* \* \* \* \*